United States Patent Office.

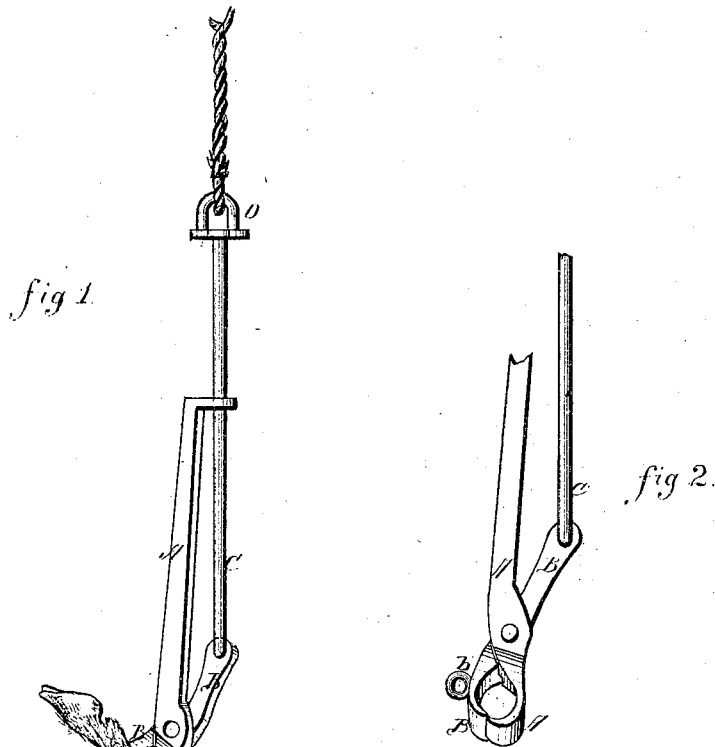

FREDERICK VOSS, JOHN P. HAX, AND HENRY KRUG, OF ST. JOSEPH, MISSOURI.

Letters Patent No. 107,312, dated September 13, 1870.

---

IMPROVEMENT IN DEVICE FOR CATCHING AND HOLDING HOGS.

---

The Schedule referred to in these Letters Patent and making part of the same.

---

*To all whom it may concern:*

Be it known that we, FREDERICK VOSS, JOHN P. HAX, and HENRY KRUG, of St. Joseph, in the county of Buchanan and State of Missouri, have invented a new and useful Device for Catching and Holding Hogs; and we do hereby declare that the following is a full, clear, and exact description thereof, sufficient to enable those skilled in the art to which our invention appertains to make and use the same, reference being had to the accompanying drawing making part of this specification, and to the letters and figures marked thereon.

The nature of our invention consists in the peculiar construction, arrangement, and operation of a device for catching, holding, and suspending hogs, preparatory to slaughtering, as hereinafter particularly described.

The device consists of two claws, A B, pivoted together, as shown in fig. 2, and operated by means of a rod, C, as shown in fig. 1.

The lower ends of the claws are curved, so that, when they come together, they will readily grasp the leg of an animal, as shown in fig. 1.

The upper end of the shank of the jaw A is bent at about a right angle, and perforated to admit of the rod C passing freely through it.

The jaw B is considerably shorter than the jaw A. At the outer side of its curved portion is formed an eye, *b*, to which a rope or chain may be fastened. At the upper end of its shank is a perforation for attachment of the rod C.

The rod C is formed with a hook on its lower end, which passes through the perforation in the shank of the jaw B, and is properly secured.

The upper portion of the rod C passes through and slides freely in the perforation in the upper end of the jaw A, and on its upper end is attached a swivel-eye, D, by which it may be hung upon a hook or attached to a rope or chain.

The shank of the jaw A is held in one hand and the rod C in the other, when the jaws are easily opened and closed, at the pleasure of the operator.

When the leg of a hog is grasped the rod C is drawn backward, the swivel-eye D attached to the rope or chain which passes around the windlass, and the animal is suspended, as shown in fig. 1.

If it is desired to release the animal without lowering the jaws, by pulling on a rope or chain attached to the eye *b* the jaws are opened and the animal falls.

What we claim as new, and desire to secure by Letters Patent, is—

The combination of the perforated jaw A, the jaw B, formed with the eye *b*, and the rod C, provided with the swivel-eye D, when constructed, arranged, and operating as herein shown and described.

The above specification signed by us this 8th day of June, 1870.

FR. VOSS.
J. P. HAX.
HENRY KRUG.

Witnesses:
   AUG. SCHMIDT,
   FERD. THAUTE.